US012163902B2

(12) United States Patent
Pantsar et al.

(10) Patent No.: US 12,163,902 B2
(45) Date of Patent: Dec. 10, 2024

(54) X-RAY WELD INSPECTION

(71) Applicant: Direct Conversion AB, Danderyd (SE)

(72) Inventors: Tuomas Pantsar, Espoo (FI); Alex Stewart, San Francisco, CA (US); Christer Ullberg, Sollentuna (SE)

(73) Assignee: Varex Imaging Sweden AB, Danderyd (SE)

( * ) Notice: Subject to any disclaimer, the term of this patent is extended or adjusted under 35 U.S.C. 154(b) by 145 days.

(21) Appl. No.: 17/571,511

(22) PCT Filed: Jul. 8, 2020

(86) PCT No.: PCT/IB2020/056415
§ 371 (c)(1),
(2) Date: Jan. 9, 2022

(87) PCT Pub. No.: WO2021/005523
PCT Pub. Date: Jan. 14, 2021

(65) Prior Publication Data
US 2023/0349840 A1 Nov. 2, 2023

(30) Foreign Application Priority Data
Jul. 11, 2019 (EP) ..................................... 19185750

(51) Int. Cl.
*G01N 23/04* (2018.01)
*G01N 23/044* (2018.01)
(Continued)

(52) U.S. Cl.
CPC ........... *G01N 23/18* (2013.01); *G01N 23/043* (2013.01); *G01N 23/044* (2018.02);
(Continued)

(58) Field of Classification Search
CPC .... G01N 23/04; G01N 23/043; G01N 23/046; G01N 23/083; G01N 23/087; G01N 23/18; G01N 2223/628; G01N 2223/629
(Continued)

(56) References Cited

U.S. PATENT DOCUMENTS 2,645,720 A 7/1953 Gross
2,719,926 A 10/1955 Procter et al.
(Continued)

FOREIGN PATENT DOCUMENTS

| CN | 1745296 | 3/2006 |
|---|---|---|
| CN | 1856272 | 11/2006 |

(Continued)

OTHER PUBLICATIONS

PCT/IB2020/056415, International Publication No. 2021/005523 as published on Jan. 14, 2021.
(Continued)

*Primary Examiner* — Allen C. Ho
(74) *Attorney, Agent, or Firm* — Laurence & Phillips IP Law

(57) ABSTRACT

An x-ray weld inspection apparatus has at least one x-ray source, at least one x-ray detector, a motor arrangement configured to move the at least one x-ray source and the at least one x-ray detector substantially along a weld, and a control device. The control device comprises memory and at least one processing core, configured to control the motor arrangement to move the at least one x-ray source and the at least one x-ray detector during an x-ray weld scan substantially along the direction of the weld. At least one section of the weld is imaged at least twice during a single x-ray scan, producing at least two imaging data sets, respectively. An angle of incidence of x-rays at the at least one section of the weld is different for the imaging data sets.

20 Claims, 7 Drawing Sheets

(51) Int. Cl.
*G01N 23/046* (2018.01)
*G01N 23/083* (2018.01)
*G01N 23/087* (2018.01)
*G01N 23/18* (2018.01)
*H04N 25/768* (2023.01)

(52) U.S. Cl.
CPC ......... *G01N 23/046* (2013.01); *G01N 23/083* (2013.01); *G01N 23/087* (2013.01); *H04N 25/768* (2023.01); *G01N 2223/306* (2013.01); *G01N 2223/3303* (2013.01); *G01N 2223/628* (2013.01); *G01N 2223/629* (2013.01)

(58) Field of Classification Search
USPC .... 378/53–55, 58–60, 62, 63, 189, 196–198
See application file for complete search history.

(56) References Cited

U.S. PATENT DOCUMENTS

| | | | |
|---|---|---|---|
| 3,124,689 A | 3/1964 | Shure | |
| 3,214,586 A | 10/1965 | Graham | |
| 3,396,272 A | 8/1968 | Olson | |
| 3,721,825 A | 3/1973 | Rasmussen | |
| 3,835,324 A * | 9/1974 | Weigle | G01N 23/18 |
| | | | 250/363.01 |
| 4,056,349 A | 11/1977 | Parisis et al. | |
| 4,095,106 A * | 6/1978 | Wallace | G01N 23/205 |
| | | | 378/54 |
| 4,283,629 A | 8/1981 | Habermehl et al. | |
| 4,388,530 A | 6/1983 | Lubecki et al. | |
| 4,490,832 A | 12/1984 | Ab | |
| 4,694,479 A | 9/1987 | Bacskai et al. | |
| 4,698,832 A | 10/1987 | Kuusi | |
| 4,725,963 A * | 2/1988 | Taylor | G01B 15/045 |
| | | | 378/58 |
| 4,785,175 A | 11/1988 | Wormald et al. | |
| 5,524,038 A | 6/1996 | Fong | |
| 5,648,996 A | 7/1997 | Gupta | |
| 6,324,249 B1 | 11/2001 | Fazzio | |
| 6,459,760 B1 * | 10/2002 | D'Ambrosio | G01N 23/04 |
| | | | 378/207 |
| 6,928,141 B2 * | 8/2005 | Carver | G01N 23/087 |
| | | | 378/197 |
| 7,120,226 B2 * | 10/2006 | Ledoux | G01N 23/223 |
| | | | 378/53 |
| 7,319,733 B2 * | 1/2008 | Price | A61B 6/4241 |
| | | | 348/E5.042 |
| 7,319,738 B2 * | 1/2008 | Lasiuk | G01N 23/04 |
| | | | 378/198 |
| 7,356,115 B2 * | 4/2008 | Ford | G01N 23/046 |
| | | | 378/57 |
| 7,634,055 B2 * | 12/2009 | Hu | G01N 23/10 |
| | | | 378/53 |
| 7,656,997 B1 | 2/2010 | Anjelly | |
| 7,672,426 B2 * | 3/2010 | Seppi | G01N 23/046 |
| | | | 378/57 |
| 7,672,427 B2 * | 3/2010 | Chen | A61B 6/027 |
| | | | 378/57 |
| 7,693,261 B2 * | 4/2010 | Robinson | G01N 23/04 |
| | | | 378/57 |
| 7,885,381 B2 * | 2/2011 | Nagumo | G01N 23/046 |
| | | | 378/59 |
| 7,912,273 B2 * | 3/2011 | Survant | G01N 23/04 |
| | | | 382/141 |
| 8,054,939 B2 * | 11/2011 | Gordon, III | G01N 23/083 |
| | | | 378/58 |
| 8,238,518 B2 | 8/2012 | Poludniowski et al. | |
| 8,662,749 B2 * | 3/2014 | Kia | A61B 6/03 |
| | | | 378/197 |
| 8,897,413 B2 | 11/2014 | Heuscher | |
| 8,923,478 B2 * | 12/2014 | Knight | G01N 23/18 |
| | | | 250/269.1 |
| 9,217,720 B2 * | 12/2015 | Prentice | G01N 23/083 |
| 9,341,546 B2 | 5/2016 | Stuke et al. | |
| 9,753,150 B2 * | 9/2017 | Nygard | G01N 23/18 |
| 9,835,735 B2 | 12/2017 | Preston | |
| 9,869,647 B2 * | 1/2018 | Featonby | G01N 23/046 |
| 9,874,507 B2 * | 1/2018 | Dingman | G01N 23/12 |
| 9,897,558 B2 * | 2/2018 | Bowdon | G01T 1/20185 |
| 10,151,716 B2 * | 12/2018 | Belcher | G01T 3/00 |
| 10,168,288 B2 * | 1/2019 | Bueno | G01N 23/087 |
| 10,261,212 B2 * | 4/2019 | Schafer | G01N 23/087 |
| 10,295,480 B2 * | 5/2019 | Hutchinson | G01N 23/18 |
| 10,470,723 B2 | 11/2019 | Herrmann et al. | |
| 10,580,614 B2 * | 3/2020 | Stevens | H01J 37/222 |
| 10,586,324 B2 * | 3/2020 | Zhao | G06T 5/002 |
| 10,641,693 B2 | 5/2020 | Dingman et al. | |
| 10,697,905 B2 * | 6/2020 | Featonby | G01N 23/20066 |
| 10,732,131 B2 * | 8/2020 | Schmitz | G01N 23/04 |
| 11,061,153 B2 * | 7/2021 | Jadrich | G01T 1/20189 |
| 11,085,886 B2 * | 8/2021 | Teleki | G01N 23/04 |
| 11,150,203 B2 * | 10/2021 | Zhu | G01N 33/2823 |
| 2003/0058991 A1 | 3/2003 | Lott | |
| 2004/0258198 A1 | 12/2004 | Carver et al. | |
| 2006/0023835 A1 | 2/2006 | Seppi | |
| 2006/0067460 A1 | 3/2006 | Price et al. | |
| 2006/0078091 A1 | 4/2006 | Lasiuk et al. | |
| 2006/0193433 A1 | 8/2006 | Ledoux et al. | |
| 2007/0116177 A1 | 5/2007 | Chen et al. | |
| 2007/0195926 A1 | 8/2007 | Munker et al. | |
| 2008/0056443 A1 | 3/2008 | Hu et al. | |
| 2008/0267345 A1 | 10/2008 | Nagumo et al. | |
| 2008/0283761 A1 | 11/2008 | Robinson et al. | |
| 2012/0039439 A1 | 2/2012 | Kia | |
| 2013/0028377 A1 | 1/2013 | Kovarik et al. | |
| 2016/0084967 A1 | 3/2016 | Nygard et al. | |
| 2016/0170075 A1 | 6/2016 | Schafer et al. | |
| 2016/0231452 A1 | 8/2016 | Abenaim | |
| 2016/0313263 A1 | 10/2016 | Featonby et al. | |
| 2016/0320282 A1 | 11/2016 | Dingman et al. | |
| 2016/0370303 A1 | 12/2016 | Schmitz et al. | |
| 2017/0038316 A1 | 2/2017 | Belcher et al. | |
| 2017/0082556 A1 | 3/2017 | Bueno et al. | |
| 2017/0284947 A1 | 10/2017 | Hutchinson et al. | |
| 2017/0316916 A1 | 11/2017 | Stevens et al. | |
| 2018/0100816 A1 | 4/2018 | Featonby et al. | |
| 2018/0182085 A1 | 6/2018 | Zhao et al. | |
| 2018/0277272 A1 | 9/2018 | Park et al. | |
| 2019/0186658 A1 | 6/2019 | Rettew et al. | |
| 2020/0264114 A1 | 8/2020 | Zhu et al. | |

FOREIGN PATENT DOCUMENTS

| | | |
|---|---|---|
| CN | 102036610 | 4/2011 |
| CN | 102165308 | 8/2011 |
| CN | 102294083 | 12/2011 |
| CN | 103954637 A | 7/2014 |
| CN | 105612433 | 5/2016 |
| CN | 105980885 | 9/2016 |
| CN | 108472000 | 8/2018 |
| CN | 109932375 A | 8/2023 |
| DE | 3818542 | 12/1989 |
| EP | 3764089 | 1/2021 |
| JP | 4463960 | 4/2002 |
| JP | 2009276285 | 11/2009 |
| JP | 2018-527966 | 9/2018 |
| KR | 100975417 | 8/2010 |
| WO | 02/082125 | 10/2002 |
| WO | 2011/023960 | 3/2011 |
| WO | 20160126829 | 8/2016 |

OTHER PUBLICATIONS

PCT/IB2020/056415, Search Report of Aug. 20, 2020.
PCT/IB2020/056415, Written Opinion of Aug. 20, 2020.
Redmer B. et al. Mechanised Weld Inspection by Tomographic Computer Aided Radiometry (TomoCAR), NDT.net, Dec. 2002, vol. 7, No. 12 [online], [retreived on Jan. 9, 2022]. Retrieved from https://www.ndt.net/article/ecndt02/308/308.htm.
"Logic" at https://www.dictionary.com/browse/logic (attached as Exhibit A), last visited on Nov. 8, 2021.

(56) References Cited

OTHER PUBLICATIONS

"Logic circuit" at https://www.dictionary.com/browse/logic-circuit (attached as Exhibit B), last visited on Nov. 8, 2021.
Korean Application No. 2020-0178076, Rejection dated Apr. 18, 2022.
Korean Application No. 2020-0178076, Amendment dated Jun. 16, 2022 (with translation).
Korean Application No. 2020-0178076, Written Opinion dated Jun. 16, 2022 (with translation).
Korean Application No. 2020-0178076, Notice of Final Rejection dated Oct. 26, 2022 (with translation).
Korean Application No. 2020-0178076, Written Opinion dated Jan. 27, 2023 (with translation).
Korean Application No. 2020-0178076, Written Decision dated Feb. 16, 2023 (with translation).
Korean Application No. 2020-0178076 published as KR102511383 on Mar. 16, 2023 (with translated claims).
EP19185750.7, Response and Amendments dated Oct. 17, 2022.
EP19185750.7, Communication dated Apr. 7, 2022.
EP19185750.7, Response and Amendments dated Jul. 8, 2021.
EP19185750.7, Search Report dated Jan. 8, 2020.
EP19185750.7, Search Opinion dated Jan. 8, 2020.
U.S. Appl. No. 16/852,279 Notice of Allowance of May 24, 2023.
U.S. Appl. No. 16/852,279 Notice of Allowance of May 16, 2023.
U.S. Appl. No. 16/852,279 Notice of Allowance of Mar. 6, 2023.
U.S. Appl. No. 16/852,279 Amendment of Feb. 20, 2023.
U.S. Appl. No. 16/852,279; Non-Final Office Action of Dec. 7, 2022.
U.S. Appl. No. 16/852,279; Examiner Interview Summary of Aug. 9, 2022.
U.S. Appl. No. 16/852,279; Amendment of Aug. 8, 2022.
U.S. Appl. No. 16/852,279; Final Office Action of Mar. 7, 2022.
U.S. Appl. No. 16/852,279; Amendment of Nov. 8, 2021.
U.S. Appl. No. 16/852,279; Non-Final Office Action of Aug. 6, 2021.
CN 202080050146.0 Office Action of Mar. 5, 2024.
CN 202080050146.0 Search Report of Mar. 5, 2024.

* cited by examiner

Controlling a motor arrangement to move at least one x-ray source and at least one x-ray detector during an x-ray weld scan substantially along a direction of the weld, the motor arrangement configured to move, using first and second mountings, respectively, the at least one x-ray source and the at least one x-ray detector ⸺ 510

Wherein at least one section of the weld is imaged at least twice during a single x-ray scan, producing at least two imaging data sets, respectively, and wherein an angle of incidence of x-rays at the at least one section of the weld is different for the imaging data sets ⸺ 520

FIGURE 7

X-RAY WELD INSPECTION

RELATED APPLICATIONS

The present application claims priority to International Application No. PCT/IB2020/056415 filed on Jul. 8, 2020, titled "X-Ray Weld Inspection," which is incorporated by reference herein, and is assigned to the assignee of the present invention. The present application also claims priority to EP Application No. 19185750.7 filed on Jul. 11, 2019, titled "X-Ray Weld Inspection," which is incorporated by reference herein, and is assigned to the assignee of the present invention.

FIELD OF THE INVENTION

The present disclosure relates to x-ray inspection of welds. At least some embodiments of the present invention find industrial application in high energy photon based weld inspection, such as pipeline weld inspection.

BACKGROUND

Pipelines of the type used to convey gas, oil, or other fluids over long distances are typically formed of metallic sections. These may be joined together with welds or more specifically girth welds. In many situations, the pipelines are constructed by adding sections sequentially, one section after another. When a section is added it is welded to the immediately preceding section, to build a pipeline. Because the end of the newly added section is open, may be possible to inspect the new weld from both sides, that is, from the inside and outside, which may be done using x-ray penetration of the weld and a suitable detection system such as x-ray sensitive film or a semiconductor detector substrate, for example. In some situations, internal access to the pipeline is difficult to obtain. For example, where a pipeline has already been built and needs to be inspected for wear, the pipeline may be in use, or at least partly clogged, during inspection. Therefore, a system of inspection completely external to the pipeline is of interest.

A weld in pipelines could also be longitudinal, that is, in the direction of the pipeline or a weld in a T-shaped connection or any other relevant shape. The term weld also refers to other welds in containers, tanks, automobiles or other constructions where such technology would be suitable and is thus not limited to pipelines.

Conventionally, such welds have been inspected by using a high strength, broad beam radioactive source, such as an x-ray or gamma-ray source, to penetrate both walls of the pipeline and to expose an x-ray sensitive film plate on the opposite side of the pipeline to the x-ray source. In general, in the present document the expression x-rays is employed to refer to high-energy photons. Depending on the specific application and method of high-energy photon generation, such rays may occasionally be referred to as gamma rays, but such rays are herein discussed as x-rays with no intention to exclude gamma rays.

Using semiconductor detector substrates in x-ray imaging provides benefits in that digital processing of x-ray images is faster and more versatile, and the detector substrates are more sensitive to incoming high-energy photons than film.

BRIEF DESCRIPTION OF SEVERAL VIEWS OF THE DRAWINGS

Further details, advantages and aspects of the present disclosure will become apparent from the following embodiments taken in conjunction with the drawings, wherein:

FIG. 7 is a flow graph of a method in accordance with at least some embodiments of the present invention.

DETAILED DESCRIPTION

An inspection method is described herein, which increases the amount of usable information that can be obtained from a weld inspection, such that weld sections are imaged more than once during the inspection, with different x-ray angles of incidence, to enable building a more detailed understanding of an internal structure of the weld. The weld may be a circumferential, longitudinal or T-shaped weld, for example. The weld may be a pipeline weld, for example the circumferential or longitudinal weld may be a pipeline wed. Further examples of weld types include a cryogenic tank, such as liquid natural gas (LNG) section weld, and an automotive part weld.

Although two-dimensional (2D) radiographic imaging of a weld typically produces adequate results, it fails in some cases where the orientation of a defect, such as a crack, along the pipe makes it difficult to observe it. X-rays may be generated using various suitable methods, such as linear accelerators, synchrotrons, x-ray tubes or isotope sources, for example. X-ray energies may fall in the range of 50 kilo electronvolt (keV), 160 keV-225 keV or even 2 mega electronvolt (MeV), for example.

The x-ray beam is used to illuminate the active area (or the area with pixels) of a detector, or part of it. In case only part of the active area is illuminated, system performance may be optimized by cropping the produced image data to exclude non-illuminated areas. The non-illuminated areas might receive scattered x-rays, so they may also be used to measure or estimate the amount of scattering in the object.

Figure 1A:
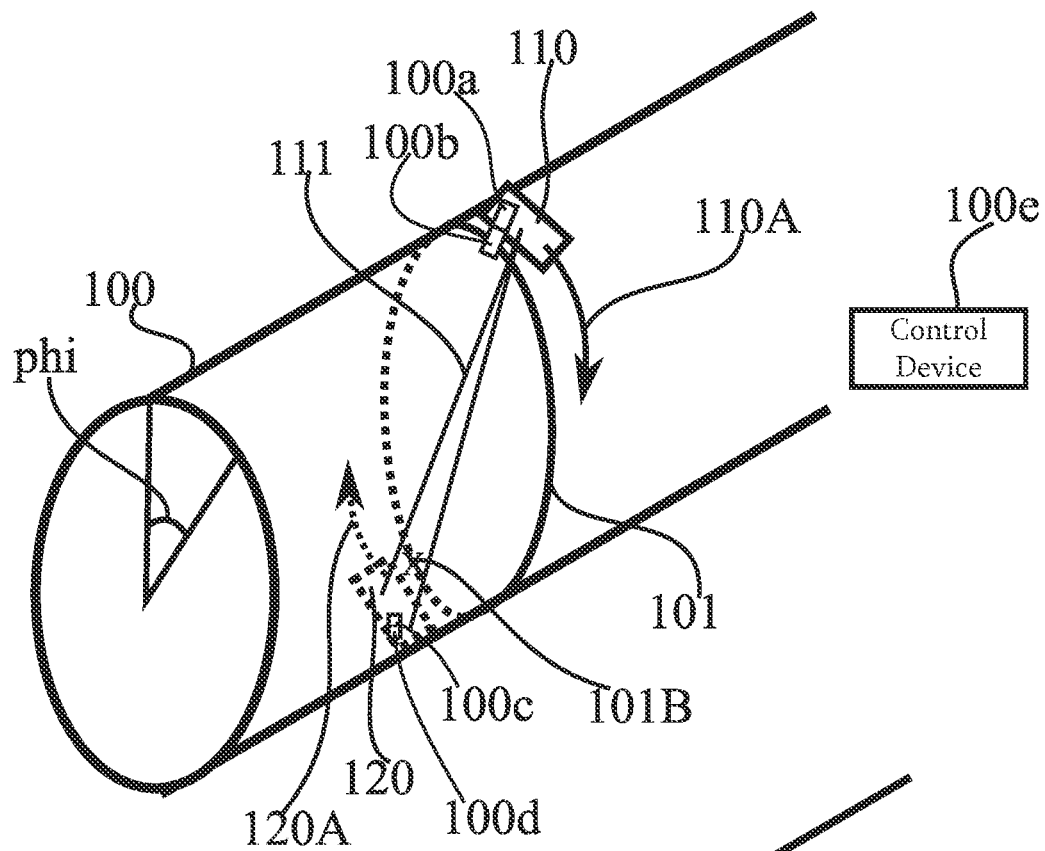
FIG. 1A illustrates an example system in accordance with at least some embodiments of the present invention.

FIG. 1A illustrates an example system for inspecting a circumferential or girth weld in accordance with at least some embodiments of the present invention. Some elements of the system are not illustrated for clarity. Pipe 100 consists of segments, which are attached in a sequential manner using welds, such as circumferential or girth weld 101. In the figure, a weld inspection process is ongoing with x-ray source 110 and x-ray detector 120 arranged externally to pipe 100, about weld 101. X-ray detector 120 may comprise a semiconductor substrate detector, for example, based on direct conversion semiconductor technology such as cadmium telluride (CdTe) or cadmium zinc telluride (CdZnTe or CZT). X-ray detector 120 is on the reverse side of the pipe 100 (or opposite side of the pipe to the x-ray source 110) in the perspective drawing, wherefore its outline is produced in dotted line in FIG. 1A. The location of an x-ray detector 120 is not limited to any particular position but shall always be such that the weld section or in general the object to be imaged is between the x-ray detector 120 and the x-ray source 110.

X-ray source 110 on the obverse side is arranged on a mounting 100*a*. Likewise, xray detector 120 on the reverse side is arranged on a mounting 100*c* of its own. The mountings 100*a*, 100*c* are separately controllable to enable moving the x-ray source 110 and the x-ray detector 120 about the weld 101 independently of each other, using a motor arrangement 100*b*, 100*d*, for example. The mountings 100*a*, 100*c* may also be mechanically coupled with each other and there may be additional manipulators on the mountings, such as electric actuators, which allow moving the x-ray source 110 or the x-ray detector 120 relative to each other. There may also be multiple manually adjustable positions for the x-ray source 110 and/or the x-ray detector 120, such as adjustment knobs. The motor arrangement 100*b*, 100*d* may comprise an electric motor arrangement, for example. The mountings 100*a*, 100*c* may comprise motorized buggies, rails, or combinations thereof, for example. A rail or rails may be attached around pipe 100 at the weld 101 location to inspect the weld 101. There may be more than one x-ray source 110 and/or there may be more than one x-ray detector 120. A movement 110A of the x-ray source 110 is schematically illustrated in FIG. 1A, and likewise a movement 120A of x-ray detector 120 is schematically illustrated in FIG. 1A.

A circumferential movement is a movement along the pipe which aims to directly move around the pipe without movement in the direction of the length of the pipe. In a two-dimensional coordinate representation, the outer surface of the pipe may be represented by coordinates (l, phi), where l is a distance from a beginning of the pipe and phi is an angle from a reference orientation of the pipe. For example, phi=0 may be selected as the direction directly upward from a centre of the pipe. Thus, as an example, if a device is placed on top of the pipe and it is moved circumferentially to the bottom of the pipe without moving it along the length of the pipe, phi increases from zero to 360 degrees and l remains constant. In this sense, phi is a circumferential angle. Angle phi is illustrated in FIG. 1A at the end of the visible pipe segment.

In use, x-ray source 110 emits a beam of x-rays with a central ray 111, which may be generated according to processes known in the art. The central ray 111 of the beam of xrays is the portion of the beam with the highest energy level. The beam may be a fan shaped beam or a cone shaped beam, for example. The beam may be directed by a control device 100*e* of the inspection system to illuminate a section 101B of the weld 101, and the detector 120 behind the weld section 101B. Thus, an image of the weld section 101B may be obtained on the detector. Although the coupling is not shown in FIG. 1A for sake of clarity, the control system can be coupled to at least one of the motor arrangement 100*b*, 100*d*, at least one of the additional manipulators on the mountings 100*a*, 100*c*, at least one of the x-ray sources 110, and at least one of x-ray detectors 120. For ease of illustration, reference is made to the section of the weld 101B or the weld section 101B, but the referenced section 101B can be any pipe feature or other object that can be imaged using x-rays with the pipe feature or other between the x-ray source 110 and the x-ray detector 120. The section of the weld 101B refers to a portion of the weld, the pipe, or other feature that can be captured into one or more images. Multiple sets of imaging information or imaging data sets may be used to generate one or more images of the weld section 101B. As used herein, sets of imaging information and imaging data sets may be used interchangeably. As the x-ray source and x-ray detector move substantially along the direction of the weld, or in the case of a pipeline girth weld, circumferentially about the pipe, multiple imaging data sets of the entire weld may thus be obtained, for example. Movement profiles, which may comprise speeds and locations, of the x-ray source and the xray detector, influence the layer of the weld which are in focus. Therefore adjustment of the profiles may be used to select the layer to be in focus in the resulting image or images. The process of forming, from the imaging information or imaging data sets, a set of resulting images is called the imaging process or merely imaging.

The imaging information may comprise pixel data originating from the at least one x-ray detector 120. The imaging information may further comprise position data indicating, directly or indirectly, where the at least one x-ray source 110 and the at least one x-ray detector 120 were when the pixel data was obtained in the at least one x-ray detector 120. The imaging information is usable in the generation of images of the weld and/or sections 101B thereof.

The x-ray detector may comprise an x-ray sensitive sensor configured to output two-dimensional image frames, or other imaging information, corresponding to the pixels on the active area of the x-ray detector, and one or more communication links, such as Ethernet, WiFi, wireless local area networking (WLAN) links, Universal Serial Bus (USB) or other suitable technologies, to transfer the collected imaging information to a computer or to other type of equipment used to view, process and/or analyze the imaging information. The imaging apparatus overall may further comprise components, such as at least one processor or processing core, to reconstruct an image from the imaging information. The image can be reconstructed either on the x-ray detector, a dedicated processing unit, a central processing unit (CPU), a computer, a graphical processing unit (GPU), a digital signal processor (DSP), an application specific integrated circuit (ASIC), a microcontroller, a programmable logic array (PLA), device such as a field programmable logic controller (PLC), a field-programmable gate array (FPGA), or on another suitable processing device. The imaging apparatus may likewise comprise memory (for example volatile memory, like dynamic random-access memory (DRAM) or electronic solid-state non-volatile computer storage) configured to store computer program instructions arranged to control the functioning of the imaging apparatus, when these instructions are executed by the processor or processing core. The memory can include volatile memory, such as dynamic random-access memory (DRAM), or electronic solid-state non-volatile computer storage, such as flash memory. The x-ray detector assembly may be cooled to a constant temperature to ensure stable operation. The x-ray detector used has resolution and contrast capabilities which are sufficient for imaging as disclosed herein, as the skilled person will understand. In some applications different sensitivities may be used. The x-ray detector may be sufficiently sensitive to be able to collect x-ray quanta at a sensitivity which is several orders of magnitude better than what conventional x-ray film plates are able to detect.

The detector may be configured to operate in a frame output mode in which consecutive collected image frames may have overlap with respect to the section of weld 101B being imaged. The image frames output from the detector correspond to at least part of the two-dimensional spatial representation of the values of the physical pixels on the detector. The values of the physical pixels are related to the incident x-ray photons arriving to the corresponding pixels and thus may either correspond to the charge deposited by the photons or the number of the photons with possibly one or more energy discriminating circuits. The image frames or parts of the image frames may then be used as imaging information to reconstruct a final image using a time delayed integration (TDI) method either digitally or in analog domain. Alternatively, the image frames may be used to reconstruct the final image of three-dimensional voxel volume by using another reconstruction method, such as, for example, tomosynthesis, computed laminography or computer tomography (CT). In the TDI reconstruction method, the consecutive image frames are shifted one or two-dimensionally according to the movement profile of the x-ray detector along the weld, and values of the pixels are added to the values of the pixels in the final image. The shifting can be over either an integer number of pixels or over an arbitrary number, in which case the addition would be performed using a form of filtering such as finite impulse response (FIR) or infinite impulse response (IIR) filters or interpolation such as linear interpolation, spline interpolation or wavelet interpolation or by using a transform such as the Fourier transform, for example.

The x-ray detector has a two-dimensional pixel matrix with dimensions, for example, of 75 millimeter (mm)×12.8 mm or 75 mm×25.6 mm. Where the longer dimension is typically, but not necessarily perpendicular to the weld and the short dimension along the weld. The detector may have a pixel size of 55 micron (μm or micrometer), 75 μm, 100 μm or 200 μm, for example. A preferred pixel size is 100 μm or less or even 75 μm or less. The thickness of the converter material, such as CdTe, in the x-ray detector may be 0.75, 0.76-0.94 mm, 0.95 mm, 1.0 mm, 1.4 mm, 2.0 mm and 3.0 mm for example. Preferably the thickness of the of the converter material is more than 0.75 mm or 1.0 mm or even 2.0 mm or more.

The x-ray detector electronics may be synchronized to the scanning mechanism via a master clock such that data from the x-ray detector is sampled each time the detector has advanced by a predefined distance. The master clock can be generated by the processing device 420, the x-ray source 110, the x-ray detector 120, by other components in the system or by an external component or device in which case it is transmitted using a wire or wireless connection to the system.

The x-ray detector electronics may be asynchronous to the movement of the scanning mechanism. In such a case, the imaging apparatus may comprise or use additional position information or signals generated by the scanning mechanism, an optical encoder, an optical position sensor producing image data, a gyroscope, an accelerometer or other device configured to measure movement and/or position. The image data used for the additional position information may be distinct from the final x-ray images produced using the x-ray weld inspection apparatus. The position and/or speed profile can also be estimated from the output data of the detector by either tracking prominent features in the weld, such as defects or changes in thickness, or by tracking artificial fiducial markers. The artificial fiducial markers may be printed, etched, painted, ground or otherwise manufactured markers on the surface on or near the weld. The artificial fiducial markers may be part of the mechanical manipulators or other features of the system or part of an object containing a pattern of the markers. This position information or signals may be used to record the location of the x-ray detector and/or the x-ray source and/or other components in the system to thereby contribute to the imaging information, and may be used by the reconstruction algorithm to align the measured image frames to produce the desired results. This additional position information may also be used as the master clock in the synchronous mode.

This additional position information may contain translation and/or rotation information and may therefore be used to rotate, scale, warp or otherwise transform the imaging information output from the x-ray detector before the reconstruction is performed. One- or two-dimensional TDI reconstruction may be employed, for example to x-ray detector output transformed based on the additional position information. Frame output mode may be used instead of, or in addition to, TDI reconstruction. Outputted image frames may be used in other reconstruction techniques, for example to compile three-dimensional images.

The positioning signal may indicate, for example, the actual relative or absolute movement and/or position profile of the x-ray detector and/or the x-ray source. The movement and/or position profile may be expressed, for example, in terms of a distances, 2-D or 3-D coordinates, angular or arbitrary expressions characterizing the movement and/or place as a function of time.

Figure 2:
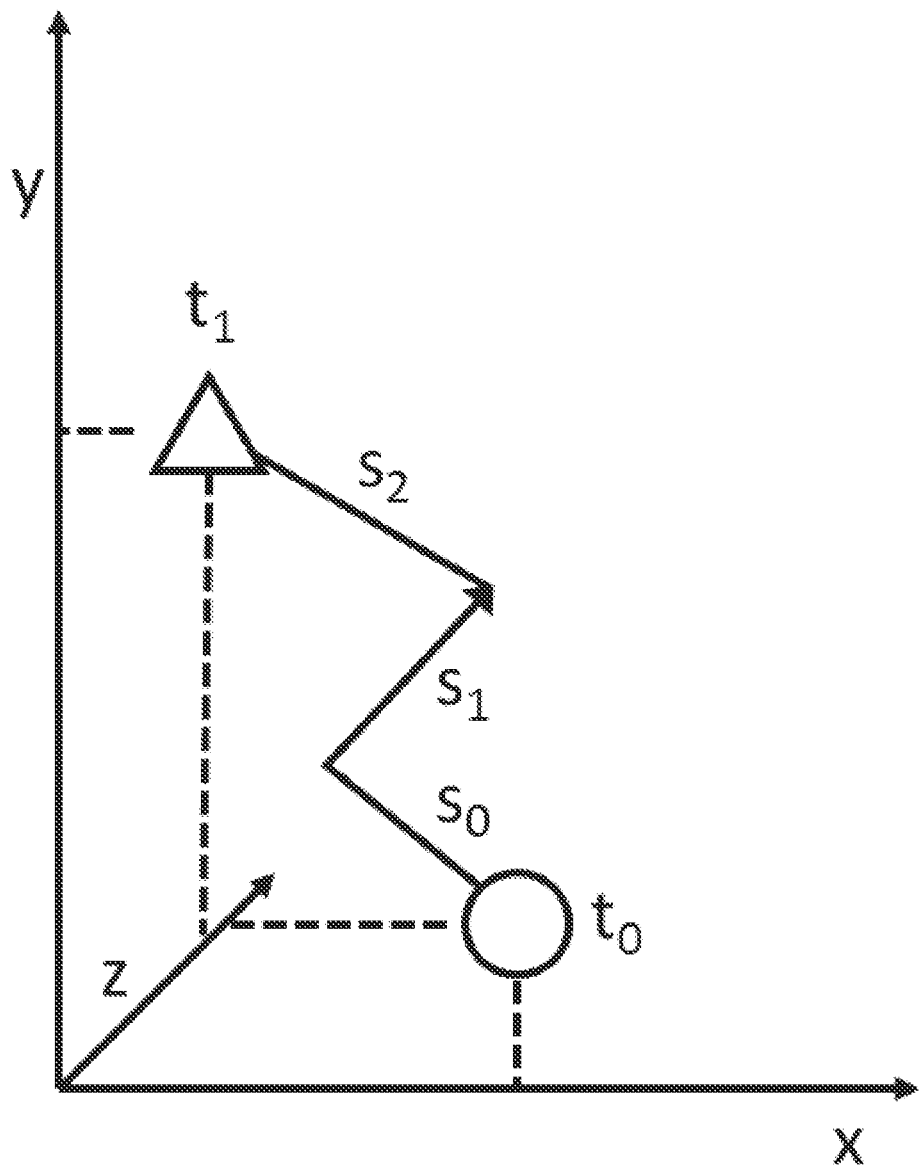
FIG. 2 illustrates an example of a movement profile of the x-ray detector and/or an x-ray source.

FIG. 2 illustrates an example of a movement profile of the x-ray detector and/or an x-ray source. FIG. 2 is in Cartesian coordinates x, y and z, and a movement from a position at time instant to (shown as a circle) to time instant $t_1$ (shown as a triangle) is expressed in terms of the Cartesian coordinates is illustrated. The overall movement consists of sub-trajectories $s_0$, $s_1$ and $s_2$. Alternatively to Cartesian coordinates, a different coordinate basis could be employed, such as, for example, polar or cylindrical coordinates.

At least some sections of the weld may be imaged more than once using different movement and/or position profile in the respective images. Where a certain section of the weld is imaged using more than one geometry, featuring, for example, different angles of incidence, an enhanced understanding of the weld may be obtained in the depth direction. Here, the angle may correspond to an angle of incidence of the x-ray beam on the section of the weld and/or an angle of arrival of an x-ray beam on a detector surface. The angle of incidence (i.e., angles $\beta_1$ and $\beta_2$) will be described herein below in connection with FIG. 3B, and the angle of arrival (i.e., angle ω) will be described in connection with FIG. 3A. The angle may be in any coordinate system and is not limited to any coordinate system used in or by the apparatus or components thereof. An obtained depth resolution of a section of the weld is proportional to a range of angles at which said section is imaged. In general, increasing the range of used angles may increase the depth resolution. The angular range can also be optimized to certain directions if there exists knowledge of the direction of a possible defect, or of other structures of interest.

The master clock and/or the position signal may also be modulated during the inspection process. In case the positioning signals are recorded, for example in the imaging information, the positioning signals may be used to vary the alignment of the collected image frames after the inspection. If the TDI method is used, this enables varying the shift between the consecutive image frames which in turn results in a different layer (depth) to be focused. Multiple images can be reconstructed by this method with different position signal modulations, which provides more information of the weld at different depths. These images can also be combined to provide a 3D representation of the weld.

The master clock and/or position signal modulation may be performed by selecting the modulation producing an image of a layer of interest. This can be either specified as a physical dimension, such as depth in the weld, or by, for example, finding the layer of maximum sharpness, contrast or other measure calculated from the image frame data. Finding maximum sharpness may involve methods similar to optical photography where the focusing distance is adjusted by analysing the image. Other possibilities, for example, include image processing means such as maximizing the response of edge detection filters such as the Sober filter or difference of Gaussian (DoG) filter. The master clock modulation may also be calculated by actively following a feature or features in in the reconstructed image. In case the feature becomes less sharp, the modulation can be adjusted slightly to either direction. If the resulting sharpness is better, the modulation is accepted. On the other hand, if the resulting sharpness is worse, the opposite direction may be tried.

In use, the x-ray source 110 may be positioned to illuminate the weld section 101B closest to the x-ray detector 120, while directing beam 111 past the weld closest to the x-ray source 110. In other words, beam 111 may be slightly angled to only illuminate one section of the weld. In other words, in a pipeline embodiment, the x-ray beam 111 may be aligned so as to traverse the circumferential weld 101 only once, at the side closest to x-ray detector 120.

The x-ray beam 111 may also be directed through both the weld on the x-source side and the weld on the x-ray detector side. These two welds would both appear superpositioned in the image frames or image data, but the reconstruction method could selectively reduce or eliminate the image of either one of them.

The x-ray source may be collimated to a narrow fan beam, for example. This directs the beam substantially at the area of the weld, also thereby reducing the scattering of unused x-rays. Scattered x-rays could hit detector pixels from random directions, causing undesired graininess or noise in images.

Figure 1B:
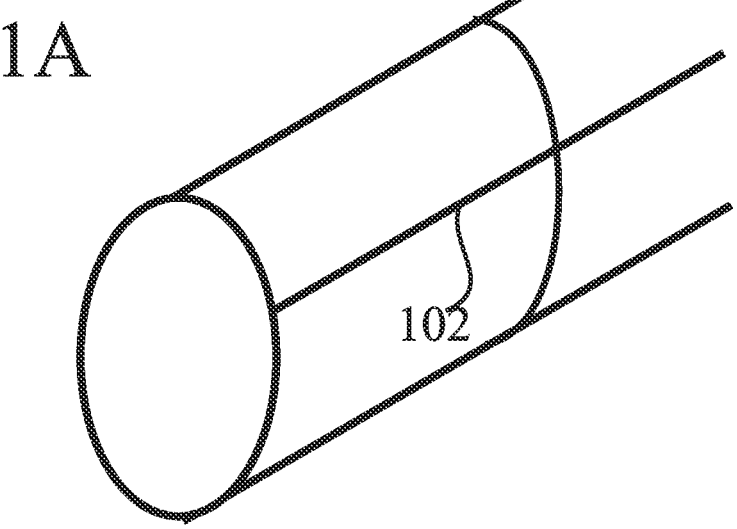
FIG. 1B illustrates a longitudinal weld.

FIG. 1B illustrates a pipe built of different sections than the pipe of the upper part of the figure, namely bent panels. Joining such panels involves longitudinal welds 102, which may have T-shaped or X-shaped intersections with each other.

FIGS. 4A-4D illustrate ways of imaging a weld section more than once. The illustrated planes comprising the weld sections 101B are curved to suggest a pipe, however, more generally these planes may be non-curved where the weld inspection does not involve a pipe. As an example, in FIG. 4A, a single x-ray detector 120 is used with a single x-ray source 110, such that beam 111 illuminates weld section 101B more than once. In detail, the x-ray detector 120 is moved tangentially to the surface (for example, back and forth, in an oscillating movement), arrows 210, while moving it along an overall circumferential (or in the direction of the weld or along the axis defined by the weld if the weld is not circumferential) trajectory during the scan of the pipe (for example, circumferential modulation, parallel modulation or movement 470 in a direction substantially parallel to the overall direction of the weld, as shown in FIG. 5B). Thus, one imaging of weld section 101B is obtained moving x-ray detector in one direction, generating one set of imaging information or a first imaging data set, and another imaging of the same weld section 101B is obtained moving x-ray detector 120 in another direction, generating a second set of imaging information or a second imaging data set, and/or again in the same direction. The x-ray source may be moved between the imaging positions, such that the x-ray source is not in the same place during the acquisition of the two imaging data sets, thus changing the angle of arrival of x-ray beam 111 upon x-ray detector 120 and the angle of incidence at section of the weld 101B. The movement of the detector may thus resemble the back-and-forth oscillating motion of a vacuum cleaner head on a carpet, while the carpet is being vacuumed. A plot of the circumferential angle phi against time is plotted in FIG. 4B. Therefore, in this option, a smaller-amplitude back-and-forth (oscillating or sine wave) circumferential movement is superimposed on the broader, overall circumferential movement 120A (slope of the sine wave) about the weld.

In some variants, a second back-and-forth (oscillating) movement, substantially transverse to the circumferential movement (for example, perpendicular modulation or movement 460 in a direction substantially perpendicular to the overall direction of the weld, as shown in FIG. 5B), is also, or alternatively, used to obtain more imaging information of weld section 101B. This combination of uni-directional circumferential (or along the weld) direction and either circumferential or perpendicular modulation allows more depth information to be collected either on the whole weld or selected section of the weld. The direction along the weld is not limited to exactly follow the weld nor the perpendicular direction to be exactly perpendicular to the weld, but either of the directions may differ up to ±15°, ±30°, ±45° or even ±65°. The angle of at least one x-ray source or at least one x-ray detector to the surface of weld can be up to ±15°, ±30°, ±45° or even ±65° in a transverse direction 460 to the overall direction of the weld and/or the angle of at least one x-ray source or at least one x-ray detector to the surface of weld can be up to ±15°, ±30°, ±45° or even ±65° in parallel direction 470 to the overall direction of the weld. Having an orientation other than the perpendicular direction may be useful due to space constraints. For example, in industrial facilities pipes may be laid out close to each other, restricting freedom of movement. The proposed system and method are able to perform both types of imaging (that is movement oscillating across the weld and movement along the weld) in single scan through the weld.

Thus, in this embodiment, one or two smaller-amplitude back-and-forth (oscillating) movements are superposed on the overall movement along the length of the weld. Where two such smaller-amplitude back-and-forth movements are involved, an overall corkscrew (spiral) type movement may be generated as an example, which is illustrated in FIG. 5B.

The superimposed smaller-amplitude movement comprises translations and/or rotations of the x-ray source and/or the x-ray detector. Such translations and/or rotations are not necessarily completely aligned with the broader overall movement along the weld. The superimposed movement may be at least in part simultaneous with the broader overall movement along the weld. The benefit of having simultaneous movement is a more stable system with less vibrations which would normally be caused by accelerations and decelerations. The system may also be faster for the same reason as the average imaging movement speed may be higher. The combination of multiple movement components, illustrated in FIG. 5B, allows increasing the range of angles of incidence of x-rays 111 at the section of the weld, as illustrated in FIG. 3B. This may result in better depth resolution in the weld or section thereof.

Figure 4A:
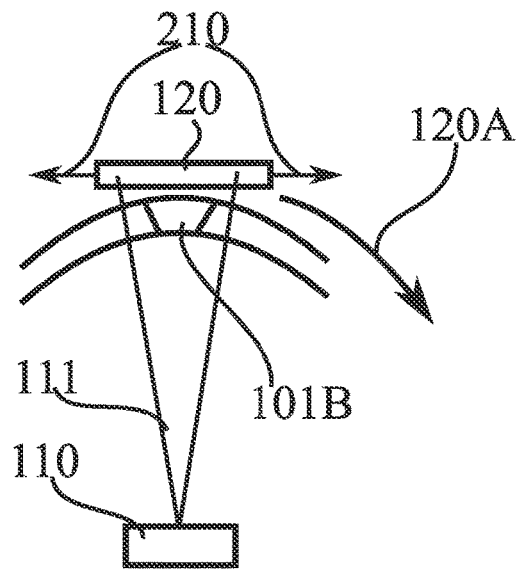
FIGS. 4A-4D illustrate ways of imaging of weld section more than once.
Figure 4B:
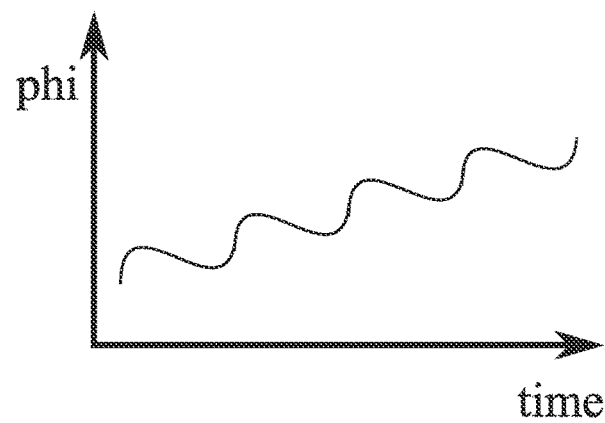
Figure 4C:
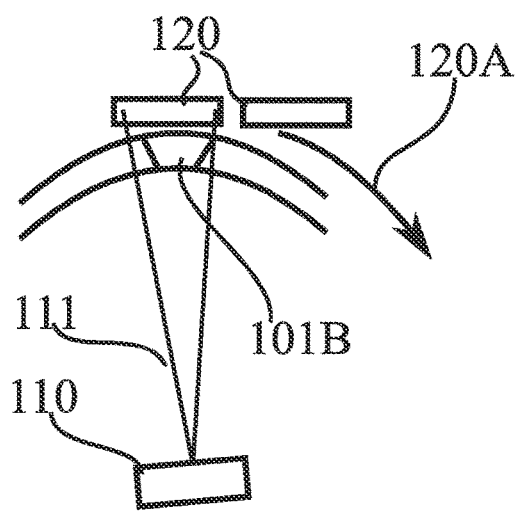

In FIG. 4C, another way to obtain plural imaging data sets of weld section 101B is illustrated. In this case, there are two x-ray detectors 120, which are moved circumferentially about the weld. A single x-ray source 110 illuminates weld section 101B first for a first detector, and then x-ray source 110 illuminates weld section 101B for the other detector. X-ray source 110 may move or rotate in between the imaging positions, to provide a separate imaging information sets with different angles of incidence of the x-ray beam 111 upon the x-ray detector 120, via the weld section 101B.

Figure 4D:
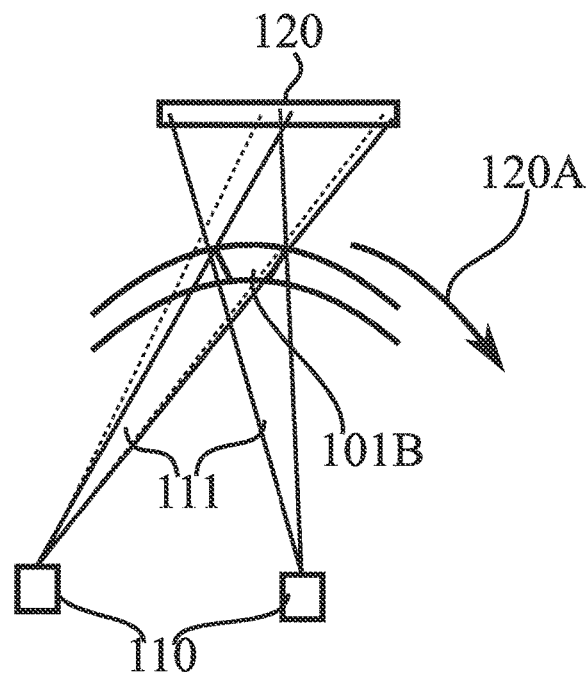

In FIG. 4D, there are two x-ray sources 110, and one x-ray detector is moved along the length of the weld, obtaining one imaging by illuminating the detector by the x-ray source and a second imaging by illuminating the detector by the second x-ray source. In this example, the x-ray sources 110 are separated by a nonzero distance (e.g., not co-located in the same place). As shown, the angles of incidence of x-ray beams 111 are different. Thus, again, two imaging data sets are obtained, with different x-ray source locations, which is here caused by having two distinct x-ray sources. The two x-ray sources may illuminate different parts of the detector (shown by the solid lines) or they can be toggled on and off in a synchronous manner so that the frames corresponding to the separate x-ray source illuminations can be separated (shown by the solid and dashed lines). More than two detector— x-ray source pairs can be included for better image quality and/or faster scan speeds. One benefit of using multiple x-ray sources is that in a typical weld inspection application, the cooling capacity of an individual x-ray source can be limited and thus using multiple sources allows a longer operational time. The part of the active area of the detector illuminated by the x-ray sources can vary from one x-ray source to another.

In general, for a pipeline weld inspection, the movement of the at least one x-ray detector and the at least one x-ray source may be non-circular to obtain the differing angles of incidence for the imaging data sets generated for the respective section(s) of the weld.

An effect similar to the movement of the one or more x-ray sources may also be achieved by moving the beam collimation, adjusting possible monochromator or diffractor angle or by focusing the x-ray beam by changing the x-ray source control signals, voltages and parameters such as the anode angle. A monochromator is a device installed between the x-ray source and object to adjust the spectrum of the x-ray beam. Any of these means may be used to redirect, that is, change the direction of, the x-ray beam which allows, for example, illuminating more than one detector from a single x-ray source.

Figure 6A:
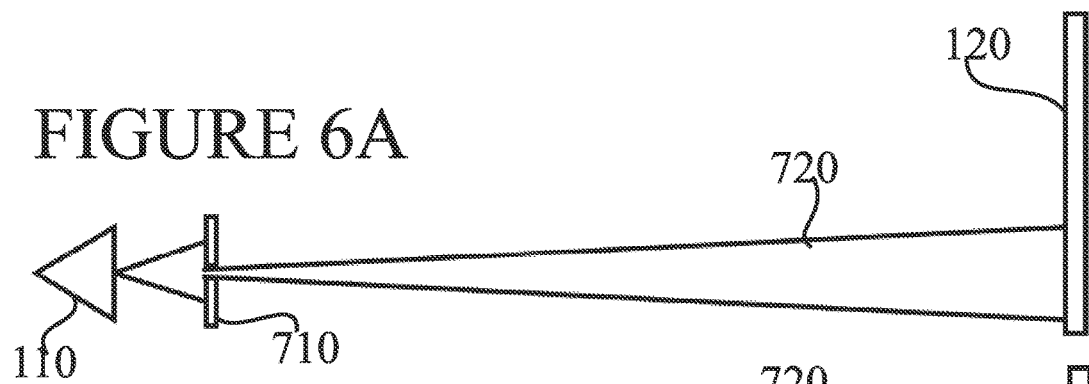
FIGS. 6A-6B illustrate an effect of moving a collimator.
Figure 6B:
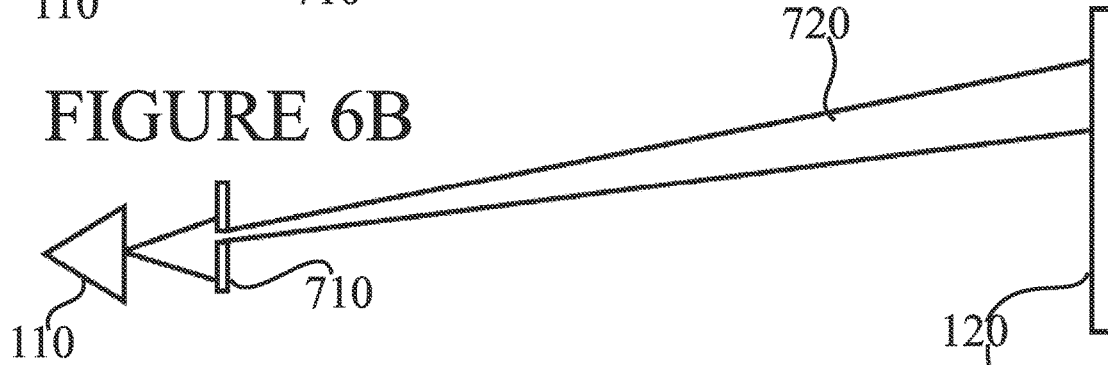

FIGS. 6A-6B illustrate an effect of moving a collimator 710. In FIG. 6A, collimator 710 is in a first position relative to the x-ray source 110, causing post-collimator beam 720 to fall on the detector 120 in a first way, and in FIG. 6B the collimator 710 is in a second position relative to the x-ray source 110, causing post-collimator beam 720 to fall on the detector 120 in a second way, as illustrated. A similar effect may be obtained by moving the focal spot of the x-ray tube or source 120 is moved electrically or mechanically.

Figure 6C:
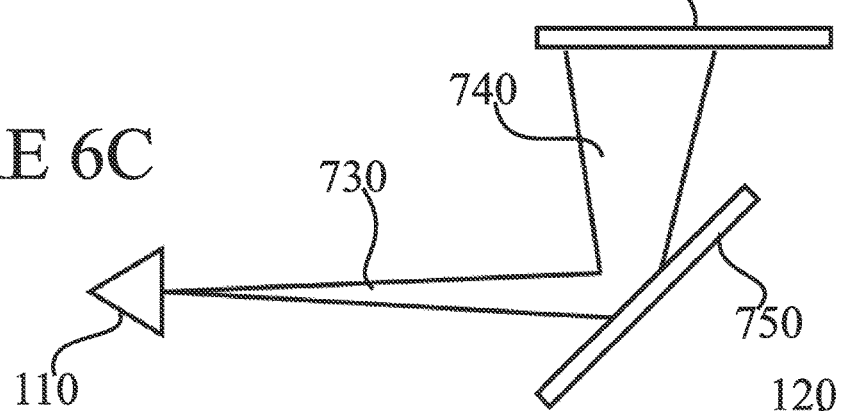
FIGS. 6C-6D illustrate an effect of moving a monochromator.
Figure 6D:
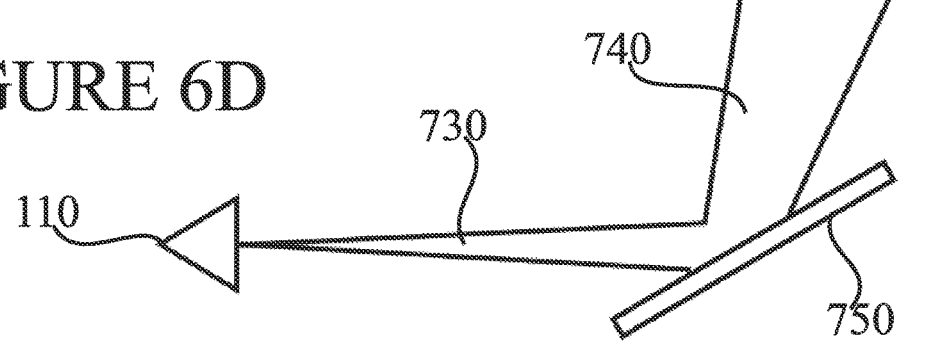

FIGS. 6A-6D illustrate an effect of moving a monochromator 750. In FIG. 6C, monochromator 750 is in a first position, receiving polychromatic beam 730 from the x-ray source 110 and directing a monochromatic beam 740 onto a first part of the detector 120. In FIG. 6D, monochromator 750 is in a second position, being tilted with respect to the first position, receiving polychromatic beam 730 from the x-ray source 110 and directing a monochromatic beam 740 onto a second part of the detector 120.

The one or more x-ray sources and one or more detectors may be used in a synchronous way to increase the image quality. The source-detector sub-systems (each containing one or more x-ray sources and one or more detectors) can be operated in such a way that the x-rays emitted by a sub-system are not detected by any other sub-systems. Reducing x-ray interference from between sub-systems may be achieved by not collecting data in a detector of another subsystem when an x-ray source of a subsystem is active, for example. For example, minimizing the scattered x-rays from one sub-system can reduce the degradation of the image quality of a second sub-system. This decoupling of the systems may be performed by adequate collimation of the x-ray beams, synchronized movement sub-systems to minimize overlap of the x-ray beams or scattered x-rays, or by temporal synchronization in which the one or more of the sub-systems are toggled on and off to reduce the effect of neighbouring sub-systems.

The plural imaging data sets may be used to enhance the understanding the inspection gains of the weld, for example, the plural imaging data sets may be focused at different depths in the weld to generate a three-dimensional model of the weld, and/or the imaging data sets may be used to average out noise and effects of x-ray scattering.

Figure 3A:
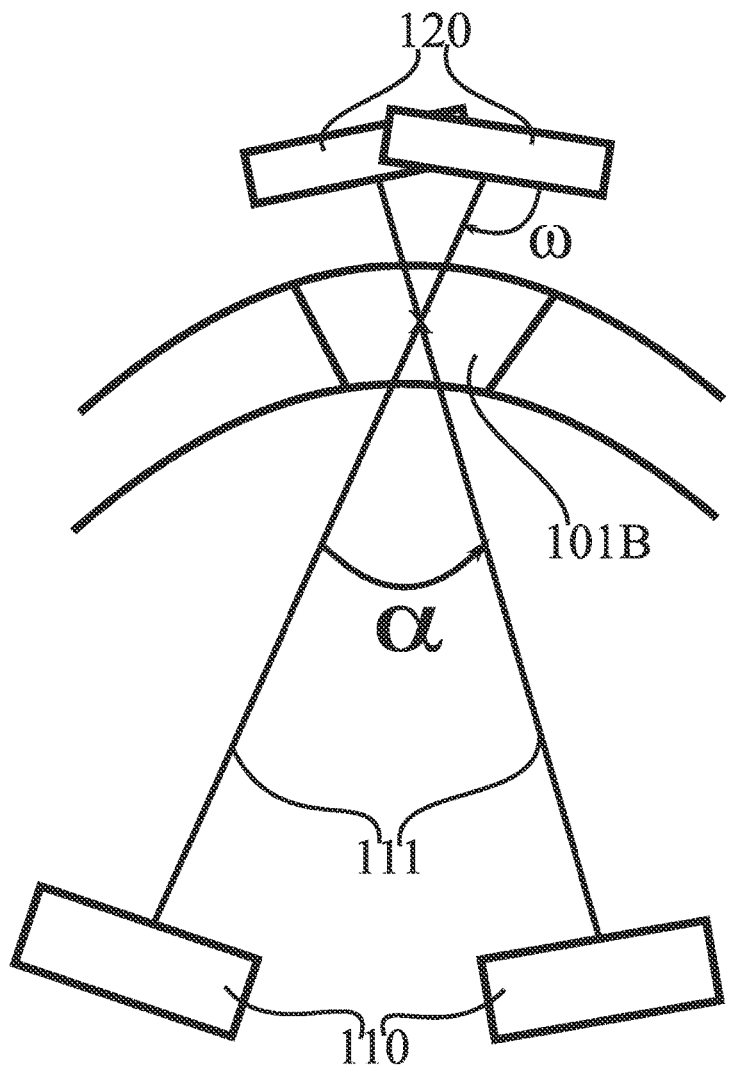
FIG. 3A illustrates x-ray imaging geometries in accordance with at least some embodiments of the present invention.
Figure 3B:
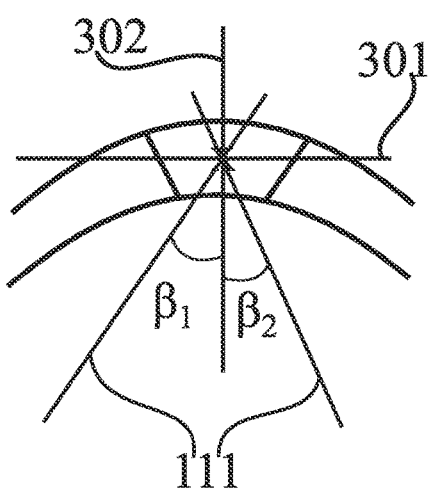
FIG. 3B illustrates angles of incidence.

FIG. 3A illustrates x-ray imaging geometries in accordance with at least some embodiments of the present invention. Illustrated is an arrangement similar to those in FIGS. 4A-4D, with two positions of x-ray source 110 and two positions of x-ray detector 120 depicted. The figure may also be interpreted as depicting two x-ray sources and two x-ray detectors, to similar effect. The object of the imaging of FIG. 3A is marked with an "x" in the weld section 101B. Two imaging positions are thus illustrated in FIG. 3A, with different imaging geometries.

The angle α indicates an angle between x-ray beam 111 of the two imaging positions concerning a specific point in the weld. The larger is angle α, the better is a depth resolution in the overall imaging process which relies on compiling imaging information from more than one imaging of the same section of the weld. The x-ray weld inspection apparatus may be configured to image at least some sections of the weld more than once, during a single x-ray scan along the direction of the weld, such that a between the imaging positions correspond to at least half a detector width (or the width of the x-ray beam at the detector in case it is narrower) in the imaging geometry used. The angle α may be defined in 3D space and is thus not tied to any particular 2D projection. Thus, the term detector width means effectively the size of the x-ray beam in the chosen direction. For example, $\sin(\alpha) > (x)/(2d)$ may be satisfied, where x is the size of the x-ray beam inside the active area of the x-ray detector in the any direction of α and d the distance between x-ray source and x-ray detector.

In an aspect, a scan refers to an imaging process during which a substantially entire weld is imaged, from a starting point to an ending point, allowing for a range of movements along the way. Alternatively or additionally, a scan refers to an imaging process the x-ray weld inspection apparatus performs based on a configuration without user intervention. During the scan, the at least one x-ray source may continuously emit x-rays, or may alternatingly emit and not emit x-rays. Likewise the at least one x-ray detector may be continuously active, or alternatingly active and inactive. The x-ray weld imaging apparatus may further be configured to autonomously modify at least one movement profile of x-ray source(s) and/or x-ray detector(s) during the scan, for example responsive to machine vision determinations.

The angle of arrival co of x-rays x-ray detector 120 may vary between imaging positions of a same section of the weld. By the angle of arrival it is meant the primary arrival angle of an x-ray beam from an x-ray source. For example, the angle of arrival may be determined at a specific phase of a data collection period, such as a midpoint or start point of the data collection period of the imaging of the section of the weld. Using different co between imaging positions enhances the diversity of imaging data obtained of the weld section, improving the quality of the resulting image.

FIG. 3B illustrates angles of incidence $\beta_1$ and $\beta_2$. The beam geometry is similar to that in FIG. 3A, in that two x-ray beams 111 are incident on a specific point in the weld. The specific point is in the origin of a coordinate system comprised of a tangential axis 301 and a normal axis 302, which are orthogonal to each other. Angle $\beta_1$ is an angle of incidence of a first one of the x-ray beams 111, and angle $\beta_2$ is an angle of incidence of a second one of the x-ray beams 111. In other words, the angle of incidence may be defined as an angle between a normal axis and the x-ray. Normal in this sense refers to perpendicular to the tangent, and applies also to welds which are on a flat surface.

Figure 5A:
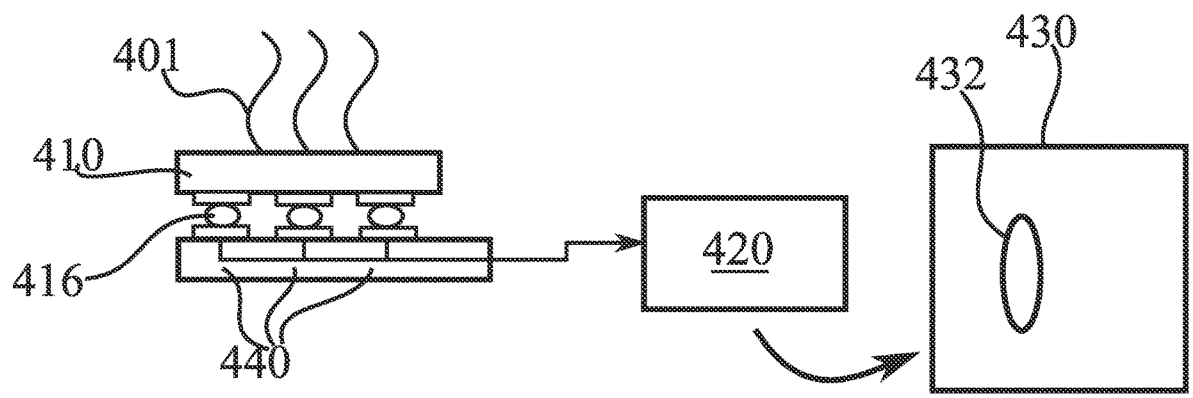
FIG. 5A illustrates an example detector substrate in accordance with at least some embodiments of the present invention.
Figure 5B:
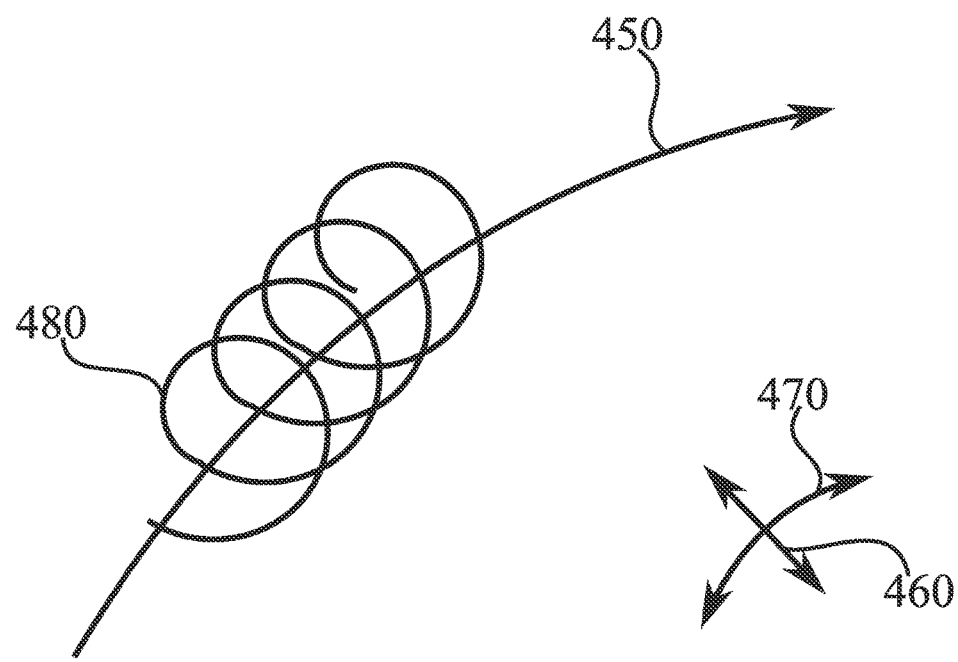
FIG. 5B illustrates a corkscrew or spiral movement of superimposed component movements.

FIG. 5A illustrates an example detector substrate in accordance with at least some embodiments of the present invention. The system of FIG. 5A is a weld imaging system. The weld imaging system may comprise an x-ray/gamma-ray imaging system, for example. The system of FIG. 5A is arranged to image radiation 401 incident from an x-ray source to detector substrate 410 from the top. Detector substrate 410 is arranged to convert the incident radiation 401 to a plurality of electrical signals, each such signal representing a value of a pixel 416 of detector substrate 410. The electric signals can be charges, voltages, currents or digital values related to the deposited x-ray dose at the pixels. The electric signals may also be one or more digital numbers corresponding to the number of photons received by the detector with one or more energy thresholds. The electric signals are collected by detector circuits 440 and output to a processing device 420 as the imaging data sets. The processing device may be comprised in or as the control device 100e (FIG. 1A), for example. The processing device 420 may perform, selectably, operations on information encoded in the electrical signals from detector circuit 440, to result in a digital image 430. In the example illustrated in FIG. 5A, this image comprises an image of an object 432, which may comprise a weld defect, for example.

The incident radiation may be x-ray or gamma radiation, for example. Detector substrate 410 may comprise CdTe substrate, CZT substrate, a gallium arsenide (GaAs) substrate, a silicon (Si) substrate, a selenium (Se) substrate or a mercury(II) iodide (HgI$_2$) substrate, for example. The detector substrate 410 may also be of indirect conversion type and consist of a scintillating layer which converts the x-rays to light such as cesium iodide (CsI) substrate, cadmium tungstate (CdWO$_4$ or CWO) substrate or gadolinium oxysulfide (Gd$_2$O$_2$S) substrate, and a complementary metal-oxide-semiconductor (CMOS), charge-coupled device (CCD) or thin-film transistor (TFT) layer converting the incident light to electricity. The operations performed in processing device 420 may comprise calibration, noise reduction, edge detection, auto-focusing, sharpness evaluation, feature tracking and/or contrast enhancement, for example. The imaging system may be furnished with information characterizing the individual pixels such as dark currents of the detector substrate or pixel specific tuning values such as gain and/or offset values, for example, each detector circuit 440 interfaced with detector substrate 410 may have a memory with such information relating to the pixel 416 linked to the particular detector circuit, or the information may otherwise be stored in or for detector circuit 440.

FIG. 5B illustrates a corkscrew (spiral) movement of superimposed component movements. Direction 450 is the overall direction of the weld, which may be a circumferential direction where a pipe is being inspected, or a linear weld, for example, depending on the application at hand. Back-and-forth (oscillating) movement 470 is in a direction substantially parallel to the overall direction of the weld, while back-and-forth (oscillating) movement 460 is in a direction substantially perpendicular to the overall direction of the weld. When these three movements are superimposed in a scanning movement, an overall corkscrew (spiral) movement 480 is generated, moving along the direction of the weld. This movement enables multiple imaging data sets of weld sections, with differing angles of incidence and angles of arrival. The movement 480 may be a path of motion of an x-ray detector, for example. In general, the angle of incidence may be defined in accordance with an x-ray beam direction, in at least one point of the beam intersecting with the section of the weld.

FIG. 7 is a flow graph of a method in accordance with at least some embodiments of the present invention. The phases of the illustrated method may be performed in by the weld inspection apparatus described herein above, for example.

Phase 510 comprises controlling a motor arrangement to move at least one x-ray source and at least one x-ray detector during an x-ray weld scan substantially along the direction of a weld, the motor arrangement configured to move, using first and second mountings, respectively, the at least one x-ray source and the at least one x-ray detector. In phase 520 at least one section of the weld is imaged at least twice during a single x-ray scan, producing at least two imaging data sets, respectively, wherein an angle of incidence of x-rays at the at least one section of the weld is different for the imaging data sets. One set of imaging information may be generated per each imaging. Each of the at least one x-ray source and the at least one x-ray detector may be moved along spline trajectories.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

According to some aspects, there is provided the subject-matter of the independent claims. Some embodiments are defined in the dependent claims.

According to a first aspect of the present disclosure, there is provided an x-ray weld inspection apparatus comprising at least one x-ray source 110 attached on a first mounting 100a, at least one x-ray detector 120 attached on a second mounting 100c, a motor arrangement 100b, 100d configured to move, using the first 100a and second mountings 100c, respectively, the at least one x-ray source 110 and the at least one x-ray detector 120 substantially along a weld, and a control device 100e comprising memory and at least one processing core, configured to control the motor arrangement 100b, 100d to move the at least one x-ray source 110 and the at least one x-ray detector 120 during an x-ray weld scan substantially along the direction of the weld, wherein at least one section of the weld 101B is imaged at least twice during a single x-ray scan, producing at least two imaging data sets, respectively, and wherein an angle of incidence of x-rays at the at least one section of the weld 101B is different for the imaging data sets.

According to a second aspect of the present disclosure, there is provided a method of x-ray weld inspection comprising controlling, 510, a motor arrangement 100b, 100d to move at least one x-ray source 110 and at least one x-ray detector 120 during an x-ray weld scan substantially along the direction of the weld, the motor arrangement 100b, 100d configured to move, using first 100a and second 100c mountings, respectively, the at least one x-ray source 110 and the at least one x-ray detector 120, wherein, 520, at least one section of the weld 101B is imaged at least twice during a single x-ray scan, producing at least two imaging data sets, respectively, and wherein an angle of incidence of x-rays at the at least one section of the weld 101B is different for the imaging data sets.

According to a third aspect of the present disclosure, there is provided an apparatus comprising means for controlling, 100e, a motor arrangement 100b, 100d to move at least one x-ray source 110 and at least one x-ray detector 120 during an x-ray weld scan substantially along the direction of the weld, the motor arrangement 100b, 100d configured to move, using first 100a and second 100c mountings, respectively, the at least one x-ray source 110 and the at least one x-ray detector 120, wherein at least one section of the weld 101B is imaged at least twice during a single x-ray scan, producing at least two imaging data sets, respectively, and wherein an angle of incidence of x-rays at the at least one section of the weld 101B is different for the imaging data sets.

According to a fourth aspect of the present disclosure, there is provided a non-transitory computer readable medium having stored thereon a set of computer readable instructions that, when executed by at least one processor, cause an apparatus to at least control, 510, a motor arrangement 100b, 100d to move at least one x-ray source 110 and at least one x-ray detector 120 during an x-ray weld scan substantially along the direction of the weld, the motor arrangement 100b, 100d configured to move, using first 100a and second 100c mountings, respectively, the at least one x-ray source 110 and the at least one x-ray detector 120, wherein, 520, at least one section of the weld 101B is imaged at least twice during a single x-ray scan, producing at least two imaging data sets, respectively, and wherein an angle of incidence of x-rays at the at least one section of the weld 101B is different for the imaging data sets.

According to a fifth aspect of the present disclosure, there is provided an x-ray weld inspection apparatus comprising at least one x-ray source 110 attached on a first mounting 100a and at least one x-ray detector 120 attached on a second mounting 100c, a motor arrangement 100b, 100d configured to move, using the first 100a and second 100c mountings, respectively, the at least one x-ray source 110 and the at least one x-ray detector 120 substantially along a weld, and a control device 100e comprising memory and at least one processing core, configured to control the motor arrangement 100b, 100d to move the at least one x-ray source 110 and the at least one x-ray detector 120 during an x-ray weld scan substantially along the direction of the weld, and compile imaging information from the at least one x-ray detector, such that at least one part of the image is reconstructed based on additional position information estimated from image data.

TECHNICAL CLAUSES

Clause 1. An x-ray weld inspection apparatus comprising:—
  at least one x-ray source attached on a first mounting;
  at least one x-ray detector attached on a second mounting;
  a motor arrangement configured to move, using the first and second mountings, respectively, the at least one x-ray source and the at least one x-ray detector substantially along a weld; and
  a control device comprising memory and at least one processing core, configured to:
    control the motor arrangement to move the at least one x-ray source and the at least one x-ray detector during an x-ray weld scan substantially along the direction of the weld;

wherein at least one section of the weld is imaged at least twice during a single x-ray scan, producing at least two imaging data sets, respectively, and wherein an angle of incidence of x-rays at the at least one section of the weld is different for the imaging data sets.

Clause 2. The weld inspection apparatus according to Clause 1, wherein the control device is configured to image the at least one section of the weld at least two times by moving at least one of the at least one x-ray detector in an oscillating movement substantially along the direction of the weld while moving the at least one x-ray detector substantially along the direction of the weld during the scan of the weld.

Clause 3. The weld inspection apparatus according to Clause 2, wherein the control device is configured to image the at least one section of the weld at least two times by further moving the at least one x-ray detector in an oscillating movement in a direction substantially perpendicular to the movement along the weld.

Clause 4. The weld inspection apparatus according to Clause 1, wherein the at least one x-ray detector comprises at least two x-ray detectors, and wherein the control device is configured to image the at least one section of the weld at least two times by moving the x-ray detectors along the direction of the weld, where the at least one weld section is imaged once by each x-ray detector.

Clause 5. The weld inspection apparatus according to Clause 4, wherein the apparatus is configured to re-direct an x-ray beam of the at least one x-ray source at least once during the scan to illuminate the at least two x-ray detectors.

Clause 6. The weld inspection apparatus according to Clause 1, wherein the at least one x-ray source comprises at least two x-ray sources and wherein the control device is configured to image the at least one section of the weld at least two times by moving the at least one x-ray detector in the direction of the weld and by imaging the at least one section of the weld by illuminating the at least one x-ray detector by each of the at least two x-ray sources.

Clause 7. The weld inspection apparatus according to Clause 6, wherein the apparatus is configured to cause the at least two x-ray sources to illuminate different parts of a same x-ray detector from among the at least one x-ray detector.

Clause 8. The weld inspection apparatus according to Clause 6, wherein the apparatus is configured to cause the at least two x-ray sources to illuminate at least partially a same part of a same x-ray detector from among the at least one x-ray detector, wherein the illumination of the at least two x-ray sources occurs at least partially during different times.

Clause 9. The weld inspection apparatus according to any of Clauses 1-8, wherein the apparatus is configured to cause the at least one section of the weld to be imaged at least two times using a time delayed integration, TDI, imaging or a three-dimensional reconstruction based on a frame sequence.

Clause 10. The weld inspection apparatus according to Clause 9, wherein the apparatus is configured to cause the at least one section of the weld to be imaged at least two times by using TDI imaging with different shifts between consecutive image frames, resulting in a different depth layer of the section of the weld to be focused.

Clause 11. The weld inspection apparatus according to any of Clauses 1-10, wherein the apparatus is configured to cause the at least one section of the weld to be imaged at least two times by producing one or more two-dimensional images of the section of the weld and one or more three dimensional images of the section of the weld.

Clause 12. The weld inspection apparatus according to any of Clauses 1-11, wherein the apparatus is configured to cause the at least one section of the weld to be imaged at least two times such that an angle $\alpha$ between x-ray beams between different times, corresponding to the times the section of the weld is imaged, satisfies the inequality $\sin(\alpha) > (x)/(2d)$, where x is a size of the x-ray beam inside an active area of the x-ray detector in the direction of $\alpha$ and d is a distance between an x-ray source and an x-ray detector during the imaging.

Clause 13. The weld inspection apparatus according to any of Clauses 1-12, wherein the control device is configured to cause the motor arrangement to move at least one of: the at least one x-ray source and the at least one x-ray detector along the weld direction at an angle of ±45° from a normal axis of the weld in a transverse direction to the weld direction or at an angle of ±45° from a tangential axis of the weld in a parallel direction to the weld direction, during the scan.

Clause 14. A method of x-ray weld inspection comprising:
controlling a motor arrangement to move at least one x-ray source and at least one x-ray detector during an x-ray weld scan substantially along the direction of the weld, the motor arrangement configured to move, using first and second mountings, respectively, the at least one x-ray source and the at least one x-ray detector;
wherein at least one section of the weld is imaged at least twice during a single x-ray scan, producing at least two imaging data sets, respectively, and
wherein an angle of incidence of x-rays at the at least one section of the weld is different for the imaging data sets.

Clause 15. The method according to Clause 14, comprising imaging the at least one section of the weld at least two times by moving at least one of the at least one x-ray detector in an oscillating movement substantially along the direction of the weld while moving the at least one x-ray detector substantially along the direction of the weld during the scan of the weld.

Clause 16. The method according to Clause 15, comprising imaging the at least one section of the weld at least two times by further moving the at least one x-ray detector in an oscillating movement in a direction substantially perpendicular to the movement along the weld.

Clause 17. The method according to Clause 14, wherein the at least one x-ray detector comprises at least two x-ray detectors, and wherein the method comprises imaging the at least one section of the weld at least two times by moving the x-ray detectors along the direction of the weld, where the at least one weld section is imaged once by each x-ray detector.

Clause 18. The method according to Clause 17, wherein the method comprises redirecting an x-ray beam of the at least one x-ray source at least once during the scan to illuminate the at least two x-ray detectors.

Clause 19. The method according to Clause 14, wherein the at least one x-ray source comprises at least two x-ray sources and wherein the method comprises imaging the at least one section of the weld at least two times by moving the at least one x-ray detector in the direction of the weld and by imaging the at least one section of the weld by illuminating the at least one x-ray detector by each of the at least two x-ray sources.

Clause 20. The method according to Clause 19, wherein the at least two x-ray sources illuminate different parts of a same x-ray detector from among the at least one x-ray detector.

Clause 21. The method according to Clause 20, wherein the at least two x-ray sources illuminate at least partially a same part of a same x-ray detector from among the at least one x-ray detector, wherein the illumination of the at least two x-ray sources occurs at least partially during different times.

Clause 22. The method according to any of Clauses 14-21, wherein the at least one section of the weld is imaged at least two times using a time delayed integration, TDI, imaging or a three-dimensional reconstruction based on a frame sequence.

Clause 23. The method according to Clause 22, wherein the at least one section of the weld is imaged at least two times by using TDI imaging with different shifts between consecutive image frames, resulting in a different depth layer of the section of the weld to be focused.

Clause 24. The method according to any of Clauses 14-23, wherein the at least one section of the weld is imaged at least two times by producing one or more two-dimensional images of the section of the weld and one or more three dimensional images of the section of the weld.

Clause 25. The method according to any of Clauses 14-24, wherein the at least one section of the weld is imaged at least two times such that an angle $\alpha$ between x-ray beams between different times, corresponding to the times the section of the weld is imaged, satisfies the inequality sin $(\alpha)>(x)/(2d)$, where x is a size of the x-ray beam inside an active area of the x-ray detector in the direction of $\alpha$ and d is a distance between an x-ray source and an x-ray detector during the imaging.

Clause 26. The method according to any of Clauses 14-25, wherein the method comprises causing the motor arrangement to move at least one of: the at least one x-ray source and the at least one x-ray detector along the weld direction at an angle of ±45° from a normal axis of the weld in a transverse direction to the weld direction or at an angle of ±45° from a tangential axis of the weld in a parallel direction to the weld direction, during the scan.

Clause 27. An apparatus comprising:
  means for controlling a motor arrangement to move at least one x-ray source and at least one x-ray detector during an x-ray weld scan substantially along the direction of the weld, the motor arrangement configured to move, using first and second mountings, respectively, the at least one x-ray source and the at least one x-ray detector;
  wherein at least one section of the weld is imaged at least twice during a single x-ray scan, producing at least two imaging data sets, respectively, and
wherein an angle of incidence of x-rays at the at least one section of the weld is different for the imaging data sets.

Clause 28. A non-transitory computer readable medium having stored thereon a set of computer readable instructions that, when executed by at least one processor, cause an apparatus to at least:
  control a motor arrangement to move at least one x-ray source and at least one x-ray detector during an x-ray weld scan substantially along the direction of the weld, the motor arrangement configured to move, using first and second mountings, respectively, the at least one x-ray source and the at least one x-ray detector;
  wherein at least one section of the weld is imaged at least twice during a single x-ray scan, producing at least two imaging data sets, respectively, and wherein an angle of incidence of x-rays at the at least one section of the weld is different for the imaging data sets.

Clause 29. An x-ray weld inspection apparatus comprising:—
  at least one x-ray source attached on a first mounting and at least one x-ray detector attached on a second mounting;
  a motor arrangement configured to move, using the first and second mountings, respectively, the at least one x-ray source and the at least one x-ray detector substantially along a weld, and
  a control device comprising memory and at least one processing core, configured to:
    control the motor arrangement to move the at least one x-ray source and the at least one x-ray detector during an x-ray weld scan substantially along the direction of the weld;
    compile imaging information from the at least one x-ray detector, such that at least one part of the image is reconstructed based on additional position information estimated from image data.

Clause 30. The weld inspection apparatus according to Clause 29, wherein the control device is configured to estimate the additional position information by tracking artificial fiducial markers visible in the image data.

Clause 31. The weld inspection apparatus according to Clause 29, wherein the control device is configured to estimate the additional position information detecting and tracking weld features in the image data.

Clause 32. The weld inspection apparatus according to Clause 29-31, wherein the additional position information comprises translation and rotation information.

Clause 33. The weld inspection apparatus according to any of Clauses 29-32, wherein the control device is configured to use the additional position information to transform the detector output before image reconstruction.

Clause 34. The weld inspection apparatus according to Clause 33, wherein the control device is configured to use the additional position information to rotate, scale, warp and/or shear the detector output before the reconstruction.

Clause 35. The weld inspection apparatus according to any of Clauses 29-34, wherein the control device is configured to reconstruct the at least some parts of the image using one- or two-dimensional time delayed integration (TDI).

Clause 36. The weld inspection apparatus according to any of Clauses 29-35, wherein the at least one x-ray detector is configured to operate in a frame output mode.

While the present disclosure has been described with reference to exemplary embodiments, it will be appreciated that the present invention is not limited to what has been described above. Accordingly, it is intended that the present invention may be limited only by the scope of the claims appended hereto.

The invention claimed is:

1. An x-ray weld inspection apparatus comprising:
  a first mounting and a second mounting;
  at least one x-ray source attached on the first mounting;
  at least one x-ray detector attached on the second mounting;
  a motor arrangement configured to move, using the first mounting and the second mounting, respectively, the at least one x-ray source and the at least one x-ray detector substantially along a weld, the weld being a pipeline weld; and
  a control device comprising memory and at least one processing core, configured to control the motor arrangement to move the at least one x-ray source and the at least one x-ray detector during an x-ray weld scan substantially along a direction of the weld;

wherein at least one section of the weld is imaged at least two times during a single x-ray scan by moving at least one of the at least one x-ray detector in an oscillating movement substantially along the direction of the weld while moving the at least one x-ray detector substantially along the direction of the weld during the single x-ray scan of the weld, producing at least two imaging data sets, respectively; and wherein an angle of incidence of x-rays at the at least one section of the weld is different for the at least two imaging data sets.

2. The x-ray weld inspection apparatus according to claim 1, wherein the at least one x-ray detector is configured to operate in a frame output mode in which consecutive collected image frames overlap with respect to one of the at least one section of the weld.

3. The x-ray weld inspection apparatus according to claim 1, wherein the control device is further configured to image the at least one section of the weld the at least two times by further moving the at least one x-ray detector in an oscillating movement in a direction substantially perpendicular to a movement along the weld.

4. The x-ray weld inspection apparatus according to claim 1, wherein the at least one x-ray detector comprises at least two x-ray detectors, and wherein the control device is further configured to image the at least one section of the weld the at least two times by moving the at least two x-ray detectors along the direction of the weld, where the at least one section of the weld is imaged once by each x-ray detector of the at least two x-ray detectors.

5. The x-ray weld inspection apparatus according to claim 4, wherein the control device is further configured to re-direct an x-ray beam of the at least one x-ray source at least once during the single x-ray scan to illuminate the at least two x-ray detectors.

6. The x-ray weld inspection apparatus according to claim 1, wherein the at least one x-ray source comprises at least two x-ray sources, and wherein the control device is further configured to image the at least one section of the weld the at least two times by moving the at least one x-ray detector along the direction of the weld, and by imaging the at least one section of the weld by illuminating the at least one x-ray detector by each x-ray source of the at least two x-ray sources.

7. The x-ray weld inspection apparatus according to claim 6, wherein the control device is further configured to cause the at least two x-ray sources to illuminate different parts of a single x-ray detector from among the at least one x-ray detector.

8. The x-ray weld inspection apparatus according to claim 6, wherein the control device is further configured to cause the at least two x-ray sources to illuminate at least partially a part of a single x-ray detector from among the at least one x-ray detector, wherein an illumination of the at least two x-ray sources occurs at least partially during different times.

9. The x-ray weld inspection apparatus according to claim 1, wherein the control device is further configured to cause the at least one section of the weld to be imaged the at least two times using a time delayed integration imaging or a three-dimensional reconstruction based on a frame sequence.

10. The x-ray weld inspection apparatus according to claim 9, wherein the control device is further configured to cause the at least one section of the weld to be imaged the at least two times by using TDI imaging with different shifts between consecutive image frames, resulting in a different depth layer of the at least one section of the weld to be focused.

11. The x-ray weld inspection apparatus according to claim 1, wherein the control device is further configured to cause the at least one section of the weld to be imaged the at least two times by producing one or more two-dimensional images of the at least one section of the weld and one or more three dimensional images of the at least one section of the weld.

12. The x-ray weld inspection apparatus according to claim 1, wherein the control device is further configured to cause the at least one section of the weld to be imaged the at least two times such that an angle a between x-ray beams between different times, corresponding to the at least two times the at least one section of the weld is imaged, satisfies an inequality $\sin(a) > (x)/(2d)$, where x is a size of an x-ray beam inside an active area of the at least one x-ray detector in a direction of a and d is a distance between an x-ray source of the at least one x-ray source and an x-ray detector of the at least one x-ray detector during the imaging.

13. The x-ray weld inspection apparatus according to claim 1, wherein the control device is further configured to cause the motor arrangement to move at least one of: the at least one x-ray source and the at least one x-ray detector along the direction of the weld at an angle of ±45° from a normal axis of the weld in a transverse direction to the direction of the weld or at an angle of ±45° from a tangential axis of the weld in a parallel direction to the direction of the weld, during the single x-ray scan.

14. A method of an x-ray weld inspection comprising:
controlling a motor arrangement to move at least one x-ray source and at least one x-ray detector during an x-ray weld scan substantially along a direction of a weld, the weld being a pipeline weld, the motor arrangement configured to move, using a first mounting and a second mounting, respectively, the at least one x-ray source and the at least one x-ray detector;

wherein at least one section of the weld is imaged at least two times during a single x-ray scan by moving at least one of the at least one x-ray detector in an oscillating movement substantially along the direction of the weld while moving the at least one x-ray detector substantially along the direction of the weld during the single x-ray scan of the weld, producing at least two imaging data sets, respectively, and wherein an angle of incidence of x-rays at the at least one section of the weld is different for the at least two imaging data sets.

15. The method according to claim 14, wherein the at least one detector is operated in a frame output mode in which consecutive collected image frames overlap with respect to the at least one section of the weld.

16. The method according to claim 14, further comprising imaging the at least one section of the weld the at least two times by further moving the at least one x-ray detector in an oscillating movement in a direction substantially perpendicular to a movement along the weld.

17. The method according to claim 14, wherein the at least one x-ray detector comprises at least two x-ray detectors, and wherein the method further comprises imaging the at least one section of the weld the at least two times by moving the at least two x-ray detectors along the direction of the weld, where the at least one section of the weld is imaged once by each x-ray detector of the at least two x-ray detectors.

18. The method according to claim 17, further comprising re-directing an x-ray beam of the at least one x-ray source at least once during the single x-ray scan to illuminate the at least two x-ray detectors.

19. The method according to claim 14, wherein the at least one x-ray source comprises at least two x-ray sources, and wherein the method further comprises imaging the at least one section of the weld the at least two times by moving the at least one x-ray detector in the direction of the weld, and by imaging the at least one section of the weld by illuminating the at least one x-ray detector by each x-ray source of the at least two x-ray sources.

20. A non-transitory computer readable medium having stored thereon a set of computer readable instructions that, when executed by at least one processor, cause an apparatus to at least:

control a motor arrangement to move at least one x-ray source and at least one x-ray detector during an x-ray weld scan substantially along a direction of a weld, the weld being a pipeline weld, the motor arrangement configured to move, using a first mounting and a second mounting, respectively, the at least one x-ray source and the at least one x-ray detector;

wherein at least one section of the weld is imaged at least two times during a single x-ray scan by moving at least one of the at least one x-ray detector in an oscillating movement substantially along the direction of the weld while moving the at least one x-ray detector substantially along the direction of the weld during the single x-ray scan of the weld, producing at least two imaging data sets, respectively, and wherein an angle of incidence of x-rays at the at least one section of the weld is different for the at least two imaging data sets.

\* \* \* \* \*